United States Patent [19]

McGettigan

[11] Patent Number: 5,152,643
[45] Date of Patent: Oct. 6, 1992

[54] METHODS AND APPARATUS FOR MILLING THE HORIZONTAL JOINT OF A STEAM TURBINE

[75] Inventor: John J. McGettigan, Middletown Twp., Delaware County, Pa.

[73] Assignee: Westinghouse Electric Corp., Pittsburgh, Pa.

[21] Appl. No.: 669,559

[22] Filed: Mar. 14, 1991

[51] Int. Cl.$^5$ .............................................. B23C 3/00
[52] U.S. Cl. .................................... 409/175; 409/190
[58] Field of Search ............... 409/175, 181, 143, 183, 409/190, 204, 206, 230

[56] References Cited

U.S. PATENT DOCUMENTS

| | | | |
|---|---|---|---|
| 1,107,221 | 8/1914 | Miller et al. | 409/204 |
| 5,032,051 | 7/1991 | Gilmore | 409/175 |

FOREIGN PATENT DOCUMENTS

| | | | |
|---|---|---|---|
| 343881 | 5/1904 | France | 409/175 |
| 28443 | 2/1983 | Japan | 409/175 |
| 1001777 | 8/1965 | United Kingdom | 409/175 |

Primary Examiner—Daniel W. Howell
Attorney, Agent, or Firm—M. G. Panian

[57] ABSTRACT

Methods and apparatus for milling a flat surface on a large scale assembly, such as the horizontal joint surface of the outer structure of a steam turbine, are disclosed. In a preferred embodiment, lateral and longitudinal drive means are installed on a lower base assembly which is specifically adapted to be mounted and leveled by engaging portions of the structure to be machined. Sliding platforms are engaged with drive means, and a milling head is mounted to the platforms to provide the capability to move the milling head both laterally and longitudinally along the surface to be machined. In a preferred embodiment, the milling head is affixed to a platform that permits indexing the milling head to a position where it may extend beyond the maximum travel of the drive means and thereby machine the corners or otherwise inaccessible areas of the structure.

12 Claims, 1 Drawing Sheet

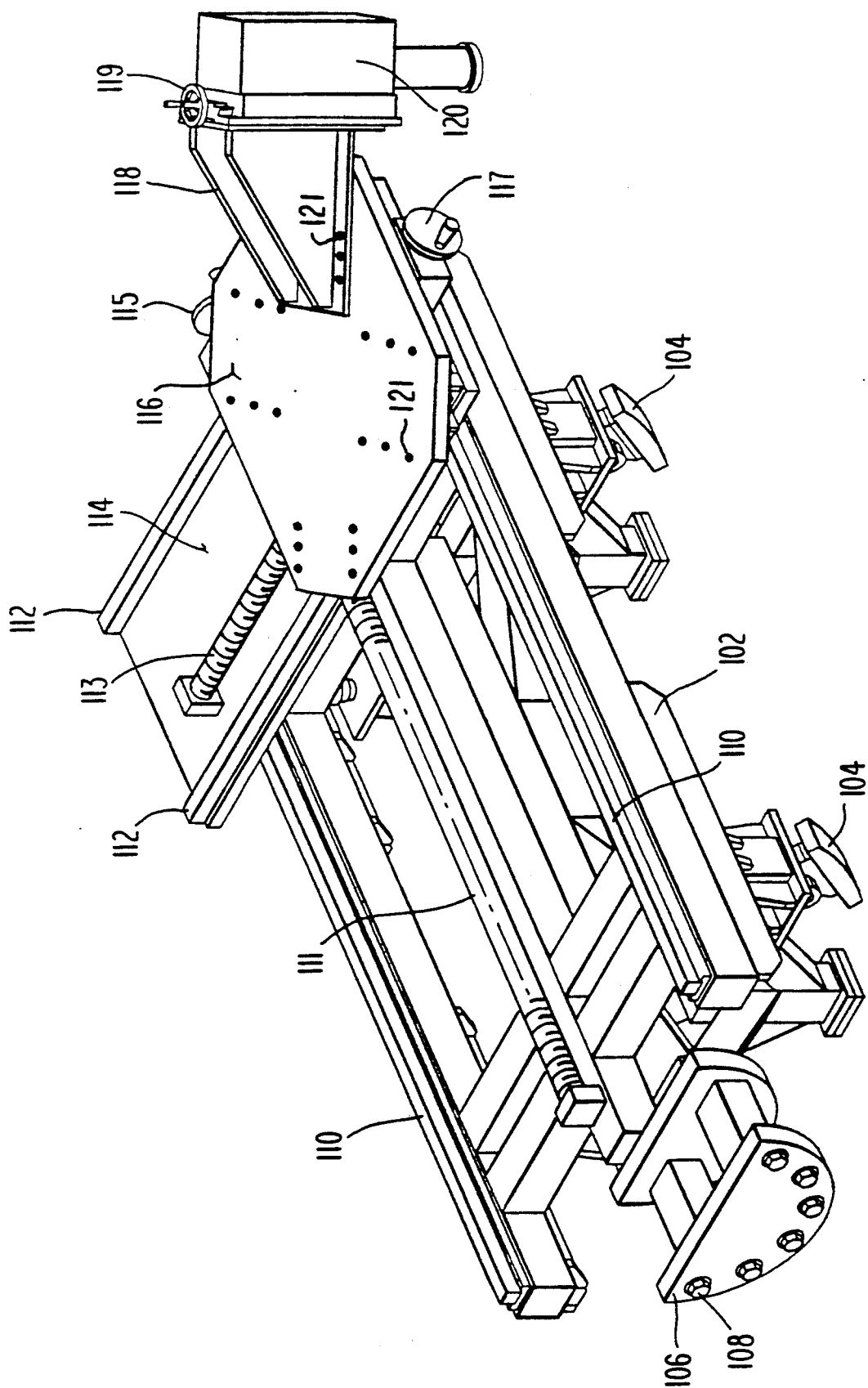

METHODS AND APPARATUS FOR MILLING THE HORIZONTAL JOINT OF A STEAM TURBINE

The present invention relates to machine tools and fixtures, and more specifically relates to methods and apparatus for machining steam turbine components.

BACKGROUND OF THE INVENTION

Steam turbines such as the high pressure steam turbines used in nuclear power plants typically are constructed such that the outer structure or casing of the steam turbine is joined along a horizontal joint. In order to ensure good efficiency and proper alignment of the inner rotating components of the steam turbine, it is necessary that the mating surface of each section of the outer structure along the horizontal joint be flat within a very narrow tolerance. However, due to the large size and weight of the turbine assembly, it is relatively difficult to machine these surfaces to the required tolerance while the components are being fabricated. Moreover, as known to those of ordinary skill, even if the required flatness is achieved in a machine shop, the dimensions will most likely change after the components are installed on-site. Additionally, in the case where a steam turbine is undergoing retrofit, maintenance or repair, the disengaged surfaces of the horizontal joint will most likely be out of tolerance and it will be impossible to reassemble in this condition. This latter out of tolerance condition arises due to the effects of thermal and mechanical stress, hysteresis, creep and other phenomena which permanently deform the assembled components.

Therefore, it would be desirable to provide methods and apparatus that permit the horizontal joint surfaces to be machined at any desired site. Such techniques should be applicable to both new turbines about to be installed, as well as to retrofits and turbine maintenance operations that require opening the turbine along the horizontal joint.

SUMMARY OF THE INVENTION

Accordingly, it has now been found that improved apparatus for milling a flat surface of a steam turbine may be constructed which comprises a lower base assembly having a lateral dimension and a longitudinal dimension and having two lateral ends comprising one or more support feet specially adapted to engage a portion of the structure of the steam turbine. Most preferably, the support feet are specially adapted to engage the blade ring support structure of the steam turbine that remains when the blade rings are removed. The lower base assembly also preferably includes gland adaptor plates affixed to each lateral end of the lower base and leveling screws threaded through the plate to engage the structure. Atop the lower base assembly, longitudinal rails for supporting an object are affixed, along with a platform attached in sliding engagement and a longitudinal drive means for selectively moving the platform along the longitudinal rails. Similarly, lateral rails for supporting an object are affixed to the platform and a milling head platform is attached in sliding engagement to the lateral rails. A lateral drive means is provided to selectively move the milling head platform along the lateral rails. Preferably, the longitudinal and lateral drives each comprise a threaded member and a hand wheel for adjusting the relative lateral and longitudinal positions. A milling head bracket affixed to the milling head platform and attached to a milling head completes the apparatus.

In preferred embodiments, additional means for attaching the milling head bracket to the milling head platform are provided, whereby the milling head bracket may be moved to one or more alternate positions relative to the milling head platform. Additionally, in certain embodiments, vertical rail means are included for adjusting the position of the milling head relative to the flat surface to be milled. The present invention also provides methods of milling a flat surface on a structure, comprising the steps of attaching a base to the structure, attaching a first drive means to the base and attaching a sliding platform to the first drive means. Next, a second drive means is attached to the sliding platform and a milling head platform is attached to the second drive means. A milling head bracket is then affixed to the milling head platform at a first location and a milling head attached to the milling head bracket. Finally, the milling head is positioned and activated to begin cutting.

BRIEF DESCRIPTION OF THE DRAWINGS

FIG. 1 is a perspective view of a preferred embodiment of the apparatus of the present invention.

DETAILED DESCRIPTION OF THE PREFERRED EMBODIMENTS

The preferred environment of this invention is a turbine structure and, more specifically the outer casing of a steam turbine. The apparatus and method of the invention have been designed for use with a newly manufactured turbine casing, or a casing of a turbine undergoing retrofit or repair. In either situation, the turbine casing is empty, and the apparatus of this invention is placed within it for the purpose of machining the turbine horizontal joint surface. It is noted, however, that the apparatus and method are adaptable to other environments.

Referring to FIG. 1, a preferred embodiment of the apparatus of the present invention is illustrated. A lower base assembly 102 is provided which includes support feet 104 to lock the lower base assembly 102 securely and precisely within the turbine structure. In accordance with the present invention, the lower base assembly 102 is supported inside the cylinder of a steam turbine by support feet 104 which are specially designed to be positioned within the portion of the turbine structure, such as the supports for the turbine blade rings. As explained above, it is frequently necessary to provide access to the inner components of a turbine by opening the outer housing along the horizontal joint. A similar condition also exists when a new turbine is being initially assembled. In any event, the interior of most turbines contains both stationary and rotational turbine blades. The latter of these are typically affixed to a blade ring that resides within a precisely machined groove in the turbine outer structure. The present invention takes advantage of the availability of such precisely machined features within the turbine outer structure, or casing, and provides support feet 104 that engage these features with the same degree of precision as the turbine components, thereby providing a stable point from which accurate measurements may be taken. Those of ordinary skill will appreciate that the layout, shape and orientation of the support feet 104 may be different for each turbine. Those of skill in the art will also realize that the interior of the turbine casing presents a number of structural features in addition to the blade rings mentioned, such as grooves and passageways, that lend themselves to receiving a support foot 104.

Preferably, at both ends of the lower base assembly 102 there are gland adaptor plates 106 that are received by the gland area of the turbine structure. Again, the details of the gland adaptor plates 106 will vary with turbine design. Generally, the gland adaptor plates 106 are designed to provide a structural portion attached to the lower base assembly 102 which engages or can be adjusted to engage the structure. On a typical steam turbine that has been disassembled, the gland area provides a convenient location for such plates. The selection of the geometry of these plates to match the gland area geometry is within capabilities of those of ordinary skill in the art familiar with turbine structures. The gland adaptor plates 106 most preferably include precision leveling screws 108 that can adjust the alignment of the overall apparatus with the plane of the turbine horizontal joint. The leveling screws 108 thus permit the lower base assembly 102 to be leveled or otherwise aligned relative to the plane of the horizontal joint. It is noted that the invention as used in other environments includes the equivalent of gland adaptor plates for aligning purposes.

In a preferred embodiment of the apparatus of the present invention, longitudinal rails 110 are affixed to the lower base 102, and a platform 114 is affixed in sliding engagement with the longitudinal rails 110. A longitudinal drive means 111 drives the platform 114 along the length of the longitudinal rails 110. In the embodiment illustrated, the longitudinal drive means 111 comprises a single drive screw connected to a longitudinal adjustment hand wheel 115. Those of ordinary skill will realize that numerous other types of drive systems, both manual and powered, can be substituted to achieve the same result of transporting the platform 114 along the longitudinal rails 110 in a controlled manner.

The platform 114 is similarly outfitted with lateral rails 112 and a milling head platform 116 affixed in sliding engagement with the lateral rails 112 and a lateral drive means 113. As explained above, in the embodiment illustrated, the lateral drive means 113 is preferably a drive screw arrangement controlled by a lateral adjustment handwheel 117 that permits the milling head platform 116 to be moved along the lateral rails 112 as desired.

Thus, the apparatus described immediately above results in essentially creating an "X-Y" milling table within the structure being machined. The milling table has a longitudinal axis and a lateral axis, with the milling head platform 116 being disposed substantially at the intersection of the axes. A milling head bracket 118 is used to mount a milling head 120 to the milling head platform 116. As shown, the milling head bracket 118 and milling head 120 are also preferably affixed in sliding engagement to thereby permit the depth (or "Z" direction) of the milling head 120 to be selected using the milling head adjustment handwheel 119. The milling head bracket 118 is preferably affixed to the milling head platform 116 using a plurality of bolts that engage threaded holes in the milling head platform 116. It will be appreciated, however, that there are a number of other ways to affix the milling head bracket 118 to the milling head platform 116. These include dovetail connections, a series of alignment pins in combination with one or more fasteners, or a plurality of clamps. Regardless of the connection used, in a preferred embodiment, several bolt hole patterns 121 or indexing other means for mounting the milling head bracket 118 to the milling head platform 116 are replicated at four locations spaced 90° apart. This feature 121 permits the milling head 120 to be indexed to one of four positions, and thus enables any part of the horizontal joint surface to be accessed merely by correctly positioning the milling head platform 116 and affixing the milling head bracket 118 and the attached milling head 120 in the appropriate position on the milling head platform 116.

Referring again to FIG. 1, one can visualize the milling head 120 moving longitudinally toward the gland adaptor plate 106. When the milling head platform 116 reaches the limit of travel of the longitudinal drive means 111, the milling head will not reach this position longitudinally but will be positioned relatively "behind" the maximum travel. However, by removing the milling head bracket 118 and reattaching it to the milling head platform 116 at a new position, the milling head 120 can now travel relatively beyond the maximum longitudinal travel of the milling head platform 116 and essentially "reach" into a corner if desired.

Broadly, the present invention provides apparatus for milling a flat surface on a structure that includes at least a base adapted to engage the structure, a milling head, and a platform for supporting the milling head. The platform is supported by a first drive means for moving the platform along a first axis and a second drive means for moving the platform along a second axis, the second axis being perpendicular to the first. Those of ordinary skill will realize that certain embodiments of the present invention will combine the functions of one or more of these elements to achieve the same result. For example, the base and parts of the drive means may be combined as one structure. Additionally, gear trains or other power transmission means might permit the various drives to share a single motor or other actuator.

The present invention also provides improved methods for machining the horizontal joint face of a steam turbine. In accordance with a preferred embodiment of the methods of the present invention, a lower base is installed in a steam turbine. Next, longitudinal rails are affixed to the lower base, and a platform is installed in sliding engagement with the longitudinal rails along with a longitudinal drive system. Lateral rails and a lateral drive system are then installed on the platform, and a milling head platform is placed in sliding engagement with the lateral rails and a lateral drive system. At this point, in a preferred embodiment, leveling screws are adjusted to level the apparatus relative to the plane of the steam turbine horizontal joint. A milling head and milling head bracket are then attached to the milling head platform. Finally, the relative position of the milling head is adjusted and the milling operation is initiated.

Those of ordinary skill will recognize that by manipulating the drive means associated with the longitudinal and lateral directions and the vertical adjustment of the milling head, the milling cut will proceed in a desired direction while remaining precisely positioned relative to the other directions. For example, the milling cutter can be moved in the longitudinal direction without disturbing its lateral position or the depth of the cut. As pointed out above in relation to the apparatus of the present invention, in certain instances it is necessary to index the milling head to one of four positions to permit access to all areas of the turbine horizontal joint surface.

Although certain embodiments of the present invention have been described with particularity, the present invention is not meant to be limited thereby. Those of skill in the art will immediately apprehend numerous modifications, variations and improvements to the methods and apparatus disclosed which do not depart from the spirit of this invention. Accordingly, reference should be made to the appended claims in order to ascertain the full scope of the present invention.

I claim:

1. Apparatus for milling a flat surface of a structure of a steam turbine, comprising:
    a lower base assembly having a lateral dimension and a longitudinal dimension and having two lateral ends comprising one or more support feet specially adapted to engage a portion of the structure of the steam turbine;
    adaptor means affixed to each lateral end of the lower base assembly for aligning the lower base assembly;
    rail means affixed to the lower base assembly, for providing two dimensional movement parallel to said flat surface;
    a milling head platform attached in sliding engagement to said rail means;
    an adjustable milling head bracket affixed to the milling head platform; and
    a milling head affixed to the milling head bracket.

2. The apparatus of claim 1, further comprising adjustable means for attaching the milling head bracket to the milling head platform, whereby the milling head bracket may be moved to one or more alternate positions relative to the milling head platform.

3. The apparatus of claim 1 further comprising milling adjustment means for adjusting the position of the milling head substantially vertically relative to the flat surface.

4. The apparatus of claim 1, wherein the support feet are specially adapted to engage the blade ring support structure of the steam turbine.

5. The apparatus of claim 1, wherein said rail means comprises longitudinal rails and a first platform attached in sliding engagement thereto, and longitudinal drive means for moving said first platform on said longitudinal rails.

6. The apparatus of claim 5, further comprising a hand wheel for adjusting the longitudinal drive means.

7. The apparatus of claim 5, wherein said rail means further comprises lateral rail means attached to said first platform, said milling head platform being slidingly engaged to said lateral rail means, and lateral drive means for selectively moving said milling head platform on said lateral rail means.

8. The apparatus of claim 7, further comprising a hand wheel for adjusting said lateral drive means.

9. Apparatus for milling a flat surface on a structure having a first longitudinal axis and a second lateral axis, comprising:
    a lower base assembly with engaging means for engaging a portion of the structure;
    a milling head;
    a platform for supporting said milling head comprising at least two locations for mounting the milling head; and
    drive means for moving said platform along said first and second axes.

10. The apparatus of claim 9, wherein said drive means has separate first and second drive means for moving said platform along said first axis and said second axis respectively.

11. The apparatus of claim 9 further comprising means for moving the milling head among a third axis, the third axis being substantially perpendicular to the first and second axes.

12. The apparatus of claim 9, wherein said engaging means further comprises screw means for adjusting the lower base assembly relative to the plane of the flat surface.

* * * * *